US012432517B2

(12) United States Patent
Gunnarsson

(10) Patent No.: US 12,432,517 B2
(45) Date of Patent: Sep. 30, 2025

(54) HRTF PRE-PROCESSING FOR AUDIO APPLICATIONS

(71) Applicant: DIRAC RESEARCH AB, Uppsala (SE)

(72) Inventor: Viktor Gunnarsson, Uppsala (SE)

(73) Assignee: Dirac Research AB, Uppsala (SE)

( * ) Notice: Subject to any disclaimer, the term of this patent is extended or adjusted under 35 U.S.C. 154(b) by 259 days.

(21) Appl. No.: 18/247,041

(22) PCT Filed: Oct. 4, 2021

(86) PCT No.: PCT/SE2021/050974

§ 371 (c)(1),
(2) Date: Mar. 28, 2023

(87) PCT Pub. No.: WO2022/075908

PCT Pub. Date: Apr. 14, 2022

(65) Prior Publication Data

US 2023/0370804 A1 Nov. 16, 2023

Related U.S. Application Data

(60) Provisional application No. 63/088,129, filed on Oct. 6, 2020.

(51) Int. Cl.
*H04S 7/00* (2006.01)

(52) U.S. Cl.
CPC .............. *H04S 7/304* (2013.01); *H04S 7/307* (2013.01); *H04S 2420/01* (2013.01)

(58) Field of Classification Search
CPC .............................. H04S 7/304; H04S 2420/01
See application file for complete search history.

(56) References Cited

U.S. PATENT DOCUMENTS

2019/0200159 A1 6/2019 Park et al.
2019/0246230 A1 8/2019 Wardle et al.
2021/0204085 A1 7/2021 Claar

FOREIGN PATENT DOCUMENTS

CN 105933818 B 10/2018
EP 3229498 A1 10/2017
(Continued)

OTHER PUBLICATIONS

Zaunschirm, Markus, et al. Binaural rendering of Ambisonic signals by head-related impulse response time alignment and a diffuseness constraint. J. Acoust. Soc. Am., 2018, pp. 3616-3627. (Year: 2018).*
(Continued)

*Primary Examiner* — James K Mooney
(74) *Attorney, Agent, or Firm* — Christensen O'Connor Johnson Kindness PLLC

(57) ABSTRACT

There is provided a method and corresponding system for processing a set including Head-Related Transfer Functions, HRTFs, for at least two different directions of sound incidence to enable improved generation, modeling or simulation of ear signals corresponding to a diffuse sound field. For each direction of sound incidence to the head, a left-ear HRTF represents the transfer function from a sound source to the left ear, and a right-ear HRTF represents the corresponding transfer function to the right ear. The method comprises applying (S1) a phase adjustment to each HRTF, for each ear and direction, for reducing Interaural Time Differences, ITD, above a threshold frequency or in a frequency band above the threshold frequency; and adding (S2) a direction-dependent Interaural Phase Difference, IPD, to each HRTF, for each ear and direction, for reducing Interaural Coherence when modelling or simulating a diffuse sound field.

15 Claims, 9 Drawing Sheets

(56) References Cited

FOREIGN PATENT DOCUMENTS

| | | | |
|---|---|---|---|
| WO | 2013149671 | A1 | 10/2013 |
| WO | 2019055572 | A1 | 3/2019 |

OTHER PUBLICATIONS

Benichoux, V., et al., "On the Variation of Interaural Time Differences With Frequency," Journal of the Acoustical Society of America 139(4):1810-1821, Apr. 2016.
Slee, S.J., and E.D. Young, "Sound Localization Cues in the Marmoset Monkey," Hearing Research 260(1-2):96-108, Feb. 2010, 30 pages.
International Search Report and Written Opinion mailed Nov. 25, 2021, issued in corresponding International Application No. PCT/SE2021/050974, filed Oct. 4, 2021, 11 pages.

* cited by examiner

HRTF PRE-PROCESSING FOR AUDIO APPLICATIONS

TECHNICAL FIELD

The proposed technology generally relates to sound reproduction, audio processing, and more particularly to a method and system for processing frequency response functions such as Head-Related Transfer Functions (HRTFs) for audio applications, a method and system for processing a set including HRTFs for at least two different directions of sound incidence, a system for generating an audio filter, a database comprising a set of processed HRTFs, an audio filter design procedure, and an audio filter or corresponding audio processing system as well as a corresponding overall audio system and computer program and computer-program product.

BACKGROUND

Head-Related Transfer Functions (HRTFs) describe how the sound pressure at the ears is affected by sound waves arriving from different directions. For a specific discrete direction of sound incidence to the head, a left-ear HRTF describes the transfer function from a sound source (at some specified distance in that direction) to the left ear, and a right ear HRTF describes the corresponding transfer function to the right ear.

A database of HRTFs may include HRTFs for a large number of directions. By way of example, HRTF databases can be used for headphone binaural signal generation in multiple different applications [1].

One application relying on a database of HRTFs is digital audio filter design for a microphone array which is used to estimate the binaural ear signals which would be present at the ears of a listener in a sound field. Such a microphone array is known as a Virtual Artificial Head (VAH) in the literature [2]. A related application is the audio filter design for producing a binaural signal from an Ambisonics signal [3]. Binaural signal generation using a VAH or Ambisonics has multiple further applications, like streaming of binaural audio from a concert, or from a teleconference.

SUMMARY

It is a general object to provide improvements with respect to processing of frequency response functions such as HRTF representations for audio applications.

It is a specific object to provide a method and system for processing frequency response functions such as Head-Related Transfer Functions (HRTFs) for audio applications.

It is a particular object to provide a method for processing a set including Head-Related Transfer Functions, HRTFs, for at least two different directions of sound incidence.

It is also an object to provide a system for processing a set including Head-Related Transfer Functions, HRTFs, for at least two different directions of sound incidence.

Another object is to provide a system for generating an audio filter.

Yet another object is to provide a database comprising a set of processed Head-Related Transfer Functions, HRTFs.

Still another object is to provide an audio filter design procedure based on such a method for processing a set of HRTFs.

It is another object to provide an audio filter or corresponding audio processing system as well as a corresponding overall audio system.

It is also an object to provide a computer program and computer-program product.

These and other objects are met by embodiments of the proposed technology.

According to a first aspect, there is provided a method for processing a set including Head-Related Transfer Functions, HRTFs, for at least two different directions of sound incidence to enable improved generation, modeling or simulation of ear signals corresponding to a diffuse sound field. For each direction of sound incidence to the head, a left-ear HRTF represents the transfer function from a sound source to the left ear, and a right-ear HRTF represents the corresponding transfer function to the right ear. The method comprises:

- applying a phase adjustment to each HRTF, for each ear and direction, for reducing Interaural Time Differences, ITD, above a threshold frequency or in a frequency band above the threshold frequency; and
- adding a direction-dependent Interaural Phase Difference, IPD, to each HRTF, for each ear and direction, for reducing Interaural Coherence when modelling or simulating a diffuse sound field.

According to a second aspect, there is provided a system for processing a set including Head-Related Transfer Functions, HRTFs, for at least two different directions of sound incidence to improve generating, modeling or simulating ear signals corresponding to a diffuse sound field,

- wherein, for each direction of sound incidence to the head, a left-ear HRTF represents the transfer function from a sound source to the left ear, and a right-ear HRTF represents the corresponding transfer function to the right ear,
- wherein said system is configured to apply a phase adjustment to each HRTF, for each ear and direction, for reducing Interaural Time Differences, ITD, above a threshold frequency or in a frequency band above the threshold frequency; and
- wherein said system is configured to add a direction-dependent Interaural Phase Difference, IPD, to each HRTF, for each ear and direction, for reducing Interaural Coherence when modelling or simulating a diffuse sound field.

According to a third aspect, there is provided a system for generating an audio filter comprising such a system for processing a set including Head-Related Transfer Functions, HRTFs, for at least two different directions of sound incidence.

According to a fourth, there is provided a database comprising a set of Head-Related Transfer Functions, HRTFs, processed according to the method of the first aspect.

According to a fifth aspect, there is provided an audio filter design procedure comprising the method for processing a set of Head-Related Transfer Functions, HRTFs, for at least two different directions of incident sound according to the first aspect, and the further step of generating an audio filter based on the processed set of HRTFs.

According to a sixth aspect, there is provided an audio filter generated according to such an audio filter design procedure.

According to a seventh aspect, there is provided an audio system comprising such an audio filter.

According to an eighth aspect, there is provided a computer program (and corresponding computer-program product) comprising instructions, which when executed by a computer, cause the computer to perform the method of the first aspect.

By way of example, the proposed technology relates to a method and/or a corresponding system for processing at least one, or normally at least two, Head-Related Transfer Function (HRTF) representation(s), or similar representation of a frequency response function, for an audio system/application, characterized by applying a phase adjustment to said at least one, or normally at least two, HRTF representation(s) to reduce Interaural Time Differences (ITD) above a threshold frequency or in a frequency band above the threshold frequency. Each so-called HRTF representation, for a given direction, normally corresponds to a left-ear HRTF and right-ear HRTF.

The step of applying a phase adjustment may be performed while adding a direction-dependent Interaural Phase Difference (IPD) for reducing or lowering Interaural Coherence at high frequencies (above a threshold frequency or in a frequency band above the threshold frequency) in diffuse sound fields.

Optionally, the ITD may be gradually reduced with increasing frequency, above the threshold frequency. In other words, applying a phase adjustment to said at least one HRTF representation may be performed such that said ITD is gradually reduced with increasing frequency, above the threshold frequency.

Expressed slightly differently, the proposed technology relates to pre-processing of one or generally more HRTF representations, sometimes referred to as HRTFs, or equivalent frequency response functions. By way of example, the invention may be based on applying a phase adjustment to each of the concerned HRTFs, uniquely for each ear and direction, in order to enable a reduction of the Interaural Time Differences (ITD) at high frequencies that occurs between the left and right ear HRTFs for sound incidence from any given direction.

An illustrative purpose is a perceptually transparent simplification of the HRTF responses which improves performance in for example the above-mentioned applications as well as other applications.

In a sense, the proposed technology may be regarded as pre-processing of an HRTF database or a selected part thereof such as one or more HRTF representations, or equivalent frequency response functions, to enable decreased ITD above a threshold frequency, while adding a direction-dependent Interaural Phase Difference (IPD) at high frequencies such that when modeling a diffuse sound field, Interaural Coherence becomes similar to that of unprocessed HRTFs.

Other advantages will be appreciated when reading the following detailed description of non-limiting embodiments of the invention.

BRIEF DESCRIPTION OF DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
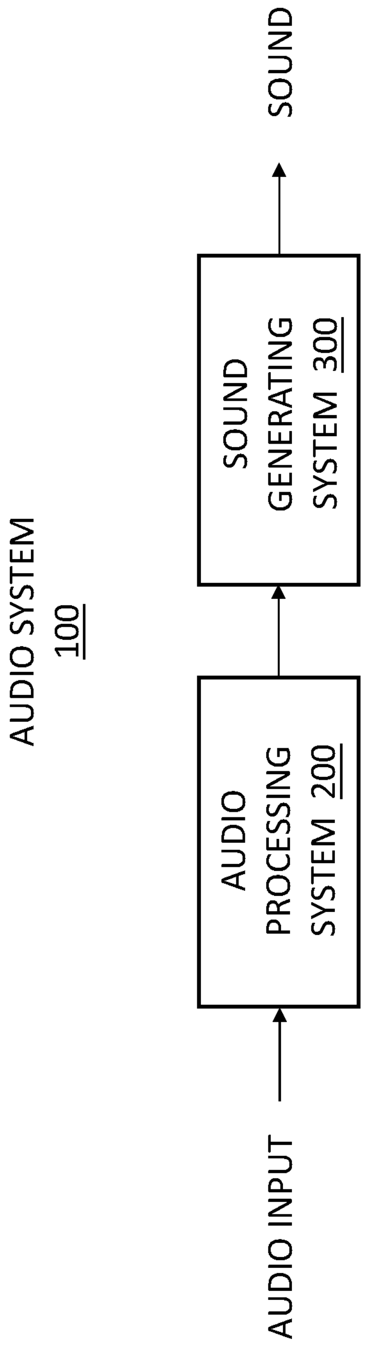
FIG. 1 is a schematic block diagram illustrating a simplified example of an audio system.

It may be useful to start with an audio system overview with reference to FIG. 1, which illustrates a simplified audio system. The audio system 100 basically comprises an audio processing system 200 and a sound generating system 300. In general, the audio processing system 200 is configured to process one or more audio input signals which may relate to one or more audio channels. The filtered audio signals are forwarded to the sound generating system 300 for producing sound.

A Head Related Impulse Response (HRIR) is the impulse response of a sound source in a (preferably) anechoic environment to the ears [1]. The frequency domain equivalent is called a Head-Related Transfer Function (HRTF).

For example, HRIRs can be measured by putting microphones in or at the ears of a person or artificial head and measuring the impulse responses to the ears from a sound source in a specific direction. Taking HRIR measurements in a number of directions produces a set of HRIRs (or corresponding HRTFs) which is usually denoted as an HRTF database. One example is found in [4]. HRTFs can also be acquired by for example computer modelling and/or numerical simulation and are sometimes simplified in some regard compared to the features of HRTFs from a real person, e.g. using a spherical head model.

Figure 2:
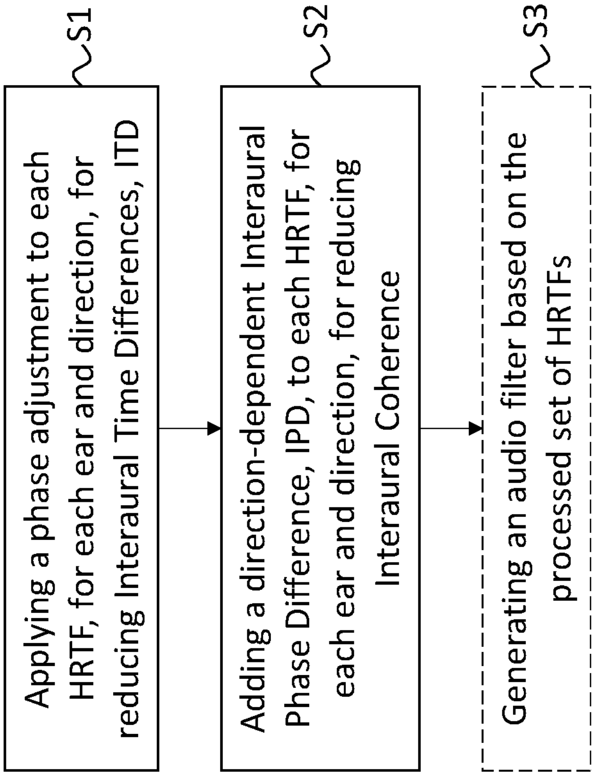
FIG. 2 is a schematic diagram illustrating an example of a method for processing a set including Head-Related Transfer Functions, HRTFs, for at least two different directions of sound incidence according to an embodiment, as well as an optional extension to an overall audio filter design procedure.

FIG. 2 is a schematic diagram illustrating an example of a method for processing a set including Head-Related Transfer Functions, HRTFs, for at least two different directions of sound incidence according to an embodiment as well as an optional extension to an overall audio filter design procedure.

According to a first aspect, there is provided a method for processing a set including Head-Related Transfer Functions, HRTFs, for at least two different directions of sound incidence to enable improved generation, modeling or simulation of ear signals corresponding to a diffuse sound field. For each direction of sound incidence to the head, a left-ear HRTF represents the transfer function from a sound source to the left ear, and a right-ear HRTF represents the corresponding transfer function to the right ear.

Basically, the method comprises:

S1: applying a phase adjustment to each HRTF, for each ear and direction, for reducing Interaural Time Differences, ITD, above a threshold frequency or in a frequency band above the threshold frequency; and S2: adding a direction-dependent Interaural Phase Difference, IPD, to each HRTF, for each ear and direction, for reducing Interaural Coherence when modelling or simulating a diffuse sound field.

In a particular example, the set of HRTFs, before applying the phase adjustment, are referred to as unprocessed HRTFs, and the step of adding a direction-dependent IPD is performed such that when modeling or simulating a diffuse sound field, the Interaural Coherence becomes perceptually the same or similar to that of the unprocessed HRTFs.

For example, the direction-dependent IPD may be set to be substantially equal to an IPD of the unprocessed HRTFs at a reference frequency where diffuse field Interaural Coherence is below a threshold value.

In a particular example, the direction-dependent IPD may be substantially constant as a function of frequency above the threshold frequency.

As a non-limiting example, the step of applying a phase adjustment and the step of adding a direction-dependent IPD may provide a modified $HRT_{mod}(\omega)$ for each direction and ear given by:

$$HRTF_{mod}(\omega)=HRTF(\omega)\ \omega<\omega_{lim}\ |HRTF(\omega)|e\hat{}(-i(\omega\tau_m-a(\omega)\theta_{ref}))\ \omega\geq\omega_{lim}$$

where $\omega_{lim}$ is the threshold frequency in rad/s, and $\tau_m$ is a time delay parameter, and $\theta_{ref}$ is a phase angle, and a(ω) is a frequency dependent real number for controlling an amount of phase modification applied at different frequencies. In the equation above, e^() is the exponential function and i is the unit imaginary number. More information of context and configuration will be given later on.

By way of example, the method may be performed for a set of HRTFs covering multiple directions, and the diffuse sound field (or the ear signals corresponding to a diffuse sound field) may be modelled or simulated based on processed HRTFs for multiple directions.

For example, the diffuse sound field may be modelled or simulated based on processed HRTFs in combination with an additional set of HRTFs, in total constituting an overall set of HRTFs for multiple directions.

In a particular example, the step of applying a phase adjustment to each HRTF may be performed such that the ITD is gradually reduced with increasing frequency, above the threshold frequency.

Optionally, the step of adding a direction-dependent Interaural Phase Difference may also be applied gradually with increasing frequency, above the threshold frequency.

By way of example, the method may be performed for processing an HRTF database or a selected subset of the HRTFs of the HRTF database.

Figure 3A:
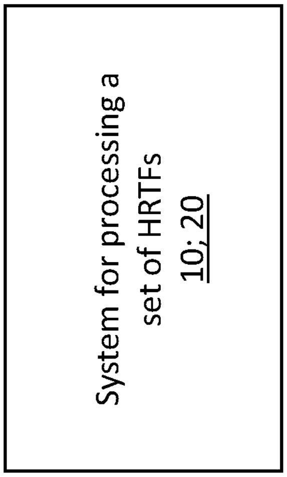
FIG. 3A is a schematic diagram illustrating an example of a system for processing a set including Head-Related Transfer Functions, HRTFs, for at least two different directions of sound incidence according to an embodiment.

FIG. 3A is a schematic diagram illustrating an example of a system for processing a set including Head-Related Transfer Functions, HRTFs, for at least two different directions of sound incidence according to an embodiment.

According to a second aspect, there is provided a system 10; 20 for processing a set including Head-Related Transfer Functions, HRTFs, for at least two different directions of sound incidence to improve generating, modeling or simulating ear signals corresponding to a diffuse sound field.

For each direction of sound incidence to the head, a left-ear HRTF represents the transfer function from a sound source to the left ear, and a right-ear HRTF represents the corresponding transfer function to the right ear.

The system is configured to apply a phase adjustment to each HRTF, for each ear and direction, for reducing Interaural Time Differences, ITD, above a threshold frequency or in a frequency band above the threshold frequency. The system is also configured to add a direction-dependent Interaural Phase Difference, IPD, to each HRTF, for each ear and direction, for reducing Interaural Coherence when modelling or simulating the diffuse sound field.

In a particular example, the set of HRTFs, before applying the phase adjustment, may be referred to as unprocessed HRTFs, and the system may be configured to add the direction-dependent IPD such that when modeling or simulating a diffuse sound field, the Interaural Coherence becomes perceptually the same or similar to that of the unprocessed HRTFs.

For example, the system may be configured to set the direction-dependent IPD to be substantially equal to an IPD of the unprocessed HRTFs at a reference frequency where diffuse field Interaural Coherence is below a threshold value.

In a particular example, the system is configured to set the direction-dependent IPD to be substantially constant as a function of frequency above the threshold frequency.

As a non-limiting example, the system may be configured to provide a modified $HRTF_{mod}(\omega)$ for each direction and ear given by:

$$HRTF_{mod}(\omega)=HRTF(\omega)\ \omega<\omega_{lim}\ |HRTF(\omega)|e\hat{}(-i(\omega\tau_m-a(\omega)\theta_{ref}))\ \omega\geq\omega_{lim}$$

where $\omega_{lim}$ is the threshold frequency in rad/s, and $\tau_m$ is a time delay parameter, and $\theta_{ref}$ is a phase angle, and a(ω) is a frequency dependent real number for controlling an amount of phase modification applied at different frequencies. More information of context and configuration will be given later on.

By way of example, the system may be configured to perform the processing for a set of HRTFs covering multiple directions, and to model or simulate the diffuse sound field based on processed HRTFs for multiple directions.

For example, the system may be configured to model or simulate the diffuse sound field based on processed HRTFs in combination with an additional set of (unprocessed or differently processed) HRTFs, in total constituting an overall set of HRTFs for multiple directions.

In a particular example, the system may be configured to process at least a subset of the HRTFs of an HRTF database.

There is also provided a system for generating an audfilter comprising a system for processing a set including Head-Related Transfer Functions, HRTFs, for at least two different directions of sound incidence.

In addition, there is provided a database comprising a set of Head-Related Transfer Functions, HRTFs, processed according to the method described herein.

Furthermore, the proposed technology also provides an overall audfilter design procedure comprising the above-described method for processing a set of Head-Related Transfer Functions, HRTFs, for at least two different directions of incident sound, and the further step S3 of generating an audio filter based on the processed set of HRTFs.

In a particular example, the audfilter design procedure is adapted for binaural signal generation.

For example, the audfilter design procedure may be adapted to provide an audfilter for generating a binaural signal for a virtual sound source, or for estimating a binaural signal from an Ambisonics signal, or for providing an audfilter design for a microphone array such as a Virtual Artificial Head.

According to yet another aspect, there is provided an audfilter generated according to such an audfilter design procedure.

There is also provided an audsystem comprising such an audfilter.

For a better understanding of the invention, reference will now be given to the following non-limiting examples of embodiments and overall contextual scenarios and applications.

Figure 3B:
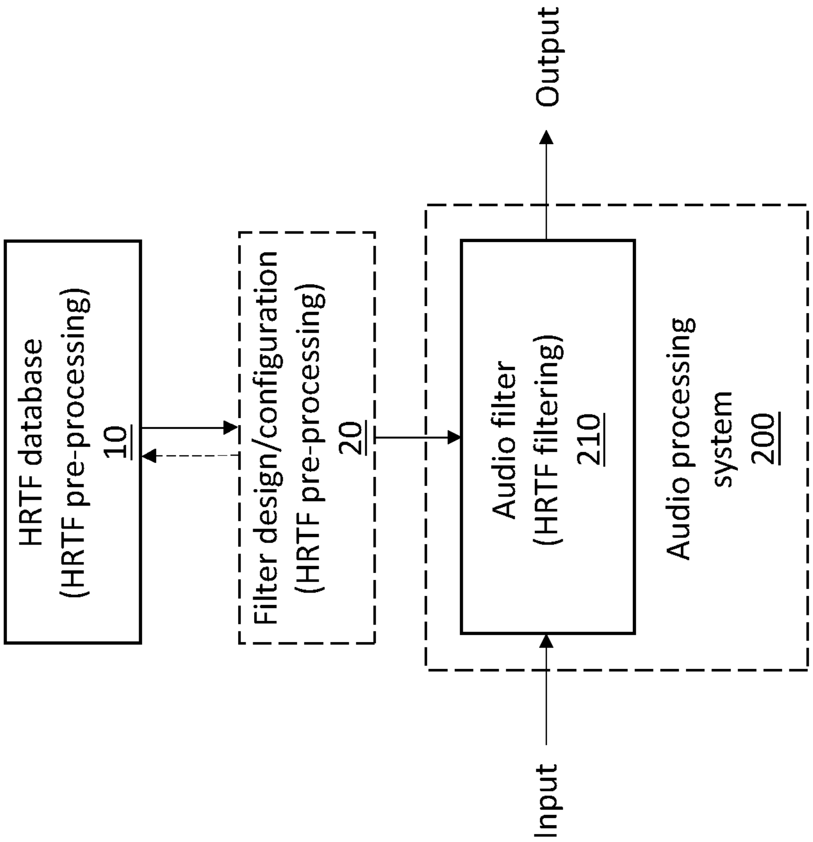
FIG. 3B is a schematic diagram illustrating an example of a HRTF-based audio processing system and HRTF-based pre-processing and filter design/configuration according to an embodiment.

FIG. 3B is a schematic diagram illustrating an example of a HRTF-based audprocessing system according to an embodiment, and HRTF-based pre-processing and filter design/configuration.

In this example, the audprocessing system 200 may be based on an audio filter 210, which performs HRTF-based filtering, i.e. HRTF filtering or processing.

The filter design procedure, including HRTF pre-processing, may be performed at least partially in a HRTF database 10, from which one or more suitable pre-processed HRTF representations is/are selected and integrated and/or merged into the (digital) audfilter.

Alternatively, or as a complement, the HRTF pre-processing may optionally be performed by a filter design/configuration module 20 based on one or more HRTF representations extracted from the HRTF database 10. The filter design/configuration module 20 may thus correspond to a system for processing a set of HRTFs as described above.

The pre-processed HRTF representation(s) may then form the basis of the audfilter 210, which is thus configured to filter and/or process an (audio) input signal and output the filtered and/or processed audsignal.

For example, the input signal could be a microphone signal, Ambisonics signal or mono signal or other suitable audinput signal.

By way of example, the output signal could be forwarded to i) a sound generating system and/or ii) for storage in a memory, e.g. for subsequent streaming or transfer to a sound generating system, and/or iii) for analysis.

Figure 4:
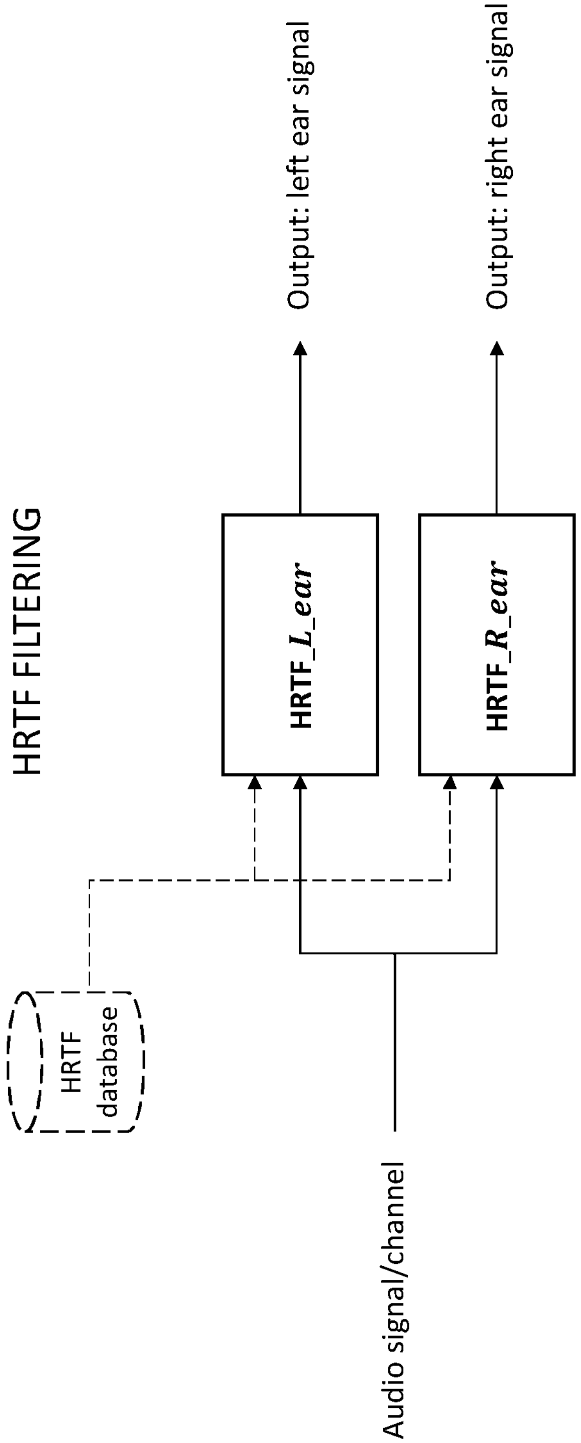
FIG. 4 is a schematic diagram illustrating an example of HRTF filtering of an audio signal using a HRTF-based audio filter pair for producing a binaural signal, also denoted a binaural signal pair, defined by a left ear signal and a right ear signal.

FIG. 4 is a schematic diagram illustrating an example of HRTF filtering of an audsignal using a HRTF-based audfilter pair for producing a binaural signal, also denoted a binaural signal pair, defined by a left ear signal and a right ear signal.

Figure 5:
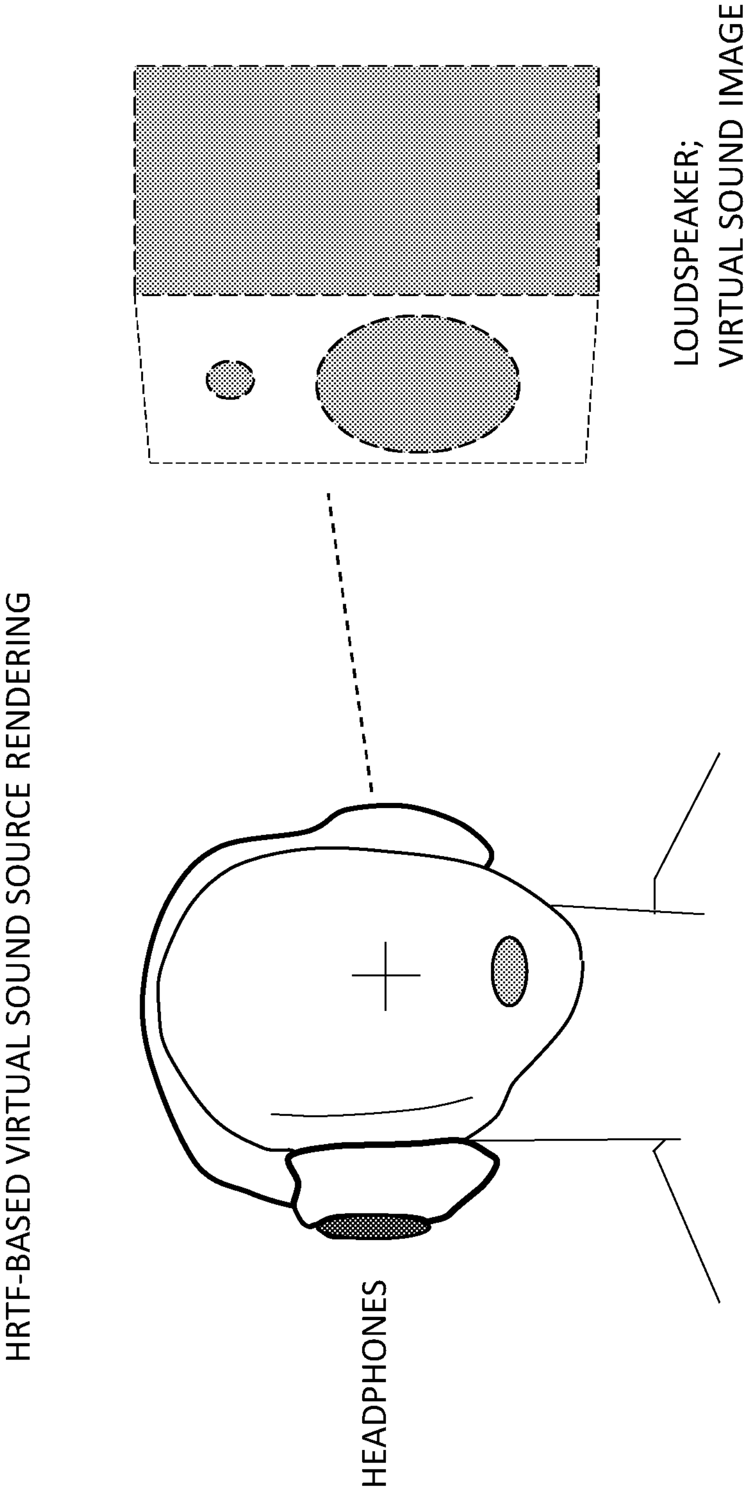
FIG. 5 is a schematic diagram illustrating the principle of HRTF-based virtual sound source rendering.

By convolving a left-ear HRIR/HRTF and a right-ear HRIR/HRTF with a monophonic audsignal, a binaural signal is produced and listening to it in headphones gives the impression of hearing a virtual sound source in the direction corresponding to the HRIR/HRTF, as schematically illustrated in FIG. 5.

Thus, an HRTF database can be used to generate virtual sound sources in all or at least multiple directions for which the database contains HRTFs, keeping in mind that an HRTF is the frequency domain equivalent of an HRIR.

The left- and right-ear HRIRs (and corresponding HRTFs) have a direction-dependent difference in delay, known as inter-aural time difference (ITD), and also an inter-aural level difference (ILD). By the well-known duplex theory, ITD is used by the hearing system for localization primarily at low frequencies below about 1.5 kHz and above this frequency ILD is a dominant localization cue [5]. It is possible to apply significant modifications, by means of digital signal processing methods, to the ITD of a left/right HRIR pair above about 1.5 kHz without major effects to the perceived localization of a single virtual sound source.

Figure 6:
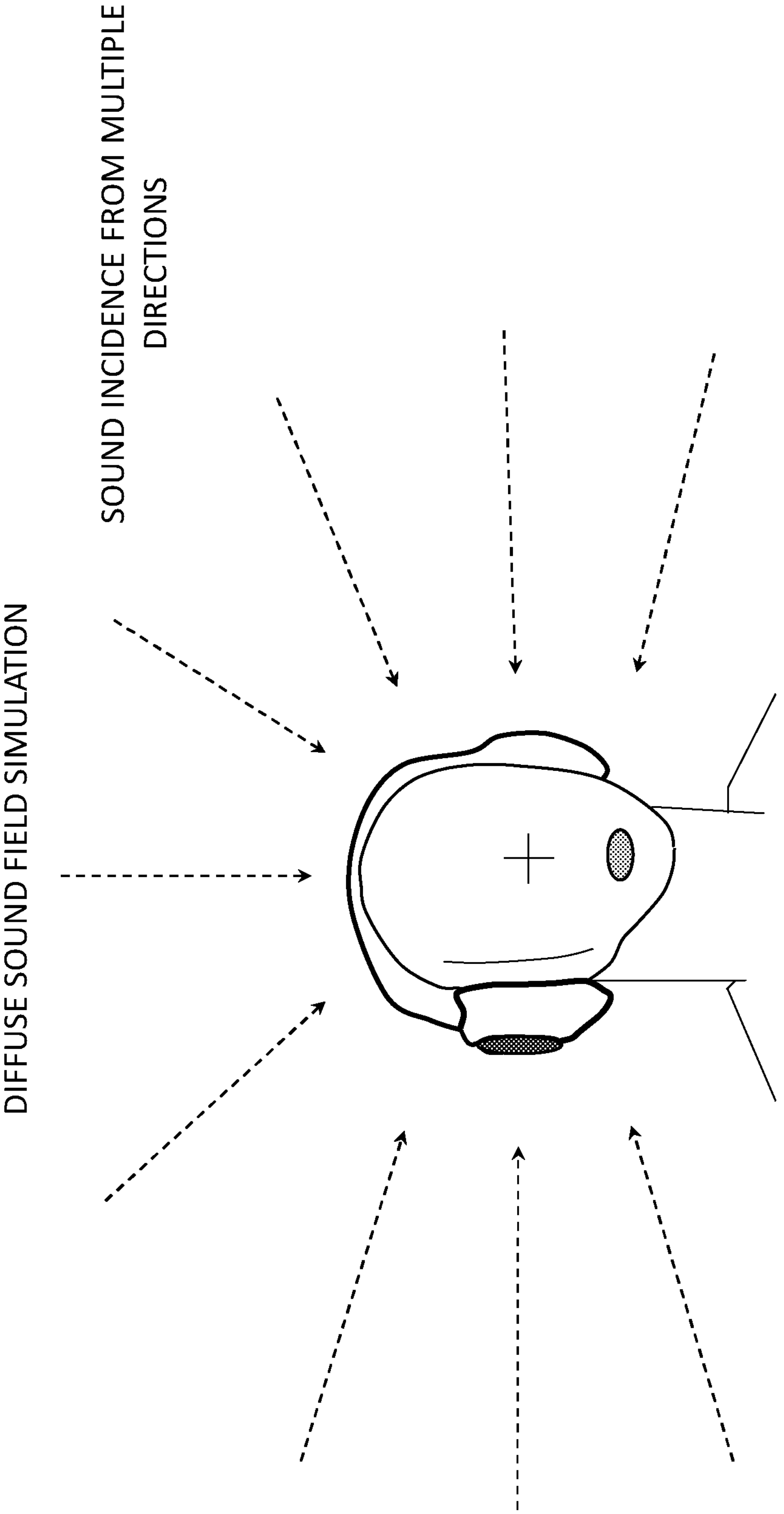
FIG. 6 is a schematic diagram illustrating diffuse sound field simulation, where a diffuse sound field is characterized by equal sound power coming from all (in theory) or at least multiple (in practice) directions.

As schematically illustrated in FIG. 6, a diffuse sound field is characterized by equal sound power coming from all (in theory) or at least multiple (in practice) directions. An HRTF database can be used to model a binaural signal corresponding to a diffuse sound field if it includes HRTFs for a sufficient number of directions. For some applications it could be sufficient with two or more directions. This can for example be done by generating a virtual sound source with noise input in each direction and letting all noise inputs be statistically uncorrelated with each other.

Interaural Coherence is a metric which describes the frequency-dependent correlation between the left and right ear signals and is known to be related to spatial impression for sound fields containing several uncorrelated sound sources. For each frequency, the interaural Coherence by definition has a value between 0 and 1. A mathematical definition (of the equivalent term coherency spectrum) can be found in reference [7]. For a binaural signal corresponding to a diffuse sound field and modelled using unprocessed HRTFs, Interaural Coherence is considerably lower at high frequencies (>~1.5 kHz) than at low frequencies (<~1.5 kHz) (in average over frequency). Above ~1.5 kHz the Interaural Coherence is in general below <0.1.

The inventor has recognized that Interaural Coherence can be affected by modifications to ITD. For example, processing an HRIR database to remove all ITD at high frequencies will unfortunately audibly increase Interaural Coherence at high frequencies when modeling a diffuse sound field using HRTFs for multiple directions. A low value of Interaural Coherence corresponds to a subjective sensation of spaciousness with the sound being perceived as originating from all directions, whereas a high value of Interaural Coherence gives a sensation of the sound originating from inside the head.

The proposed technology may be regarded, e.g. as pre-processing of an HRTF database or a selected part thereof such as one or more HRTF representations or equivalent frequency response functions to decrease ITD above a threshold frequency, while adding a direction-dependent interaural phase difference at high frequencies such that when modeling a diffuse sound field, interaural-coherence becomes perceptually similar to that of unprocessed HRTFs. Perceptually similar implies that interaural coherence should preferably be low enough to not give a perceptually significant difference to unprocessed HRTFs, and small deviations of interaural coherence may be inaudible. The inventor has also realized that the proposed technology may be beneficial even when HRTFs for relatively few (two or more) directions are considered when emulating uncorrelated sound sources for diffuse sound field simulation, i.e. when modified HRTFs for two or more directions are used for modeling or simulating a diffuse sound field.

By way of example, the invention may be based on applying a phase adjustment to each of the concerned HRTFs, uniquely for each ear and direction, in order to reduce the interaural time differences at high frequencies that occurs between the left and right ear HRTFs for sound incidence from any given direction. The purpose is a perceptually transparent simplification of the HRTF responses which improves performance in for example the above-mentioned applications.

In the prior art, binaural signals have indeed been produced from an Ambisonics signal in the context of digital filter optimization.

However, the inventor has more specifically recognized the importance of fully understanding and analyzing how ITDs can be minimized above a threshold frequency while obtaining correct modelling of high-frequency interaural coherence.

Figure 7:
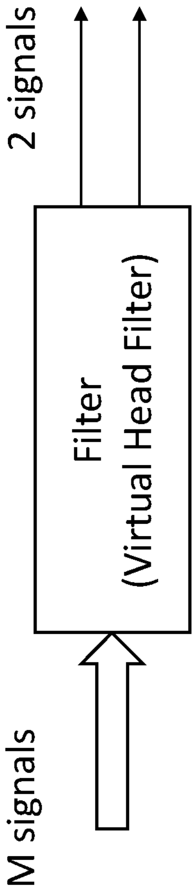
FIG. 7 is a schematic diagram illustrating an example of a digital filter configured to produce a binaural output signal from M input signals.

FIG. 7 is a schematic diagram illustrating an example of a digital filter configured to produce a binaural output signal from M input signals.

A binaural signal is understood to consist of two signals, one for the left and right ears respectively. The filter thus has M≥2 inputs and 2 outputs and can be classified as a multiple-input multiple-output (MIMO) filter.

If the M input signals represent an Ambisonics signal, the digital filter in FIG. 3 can be said to implement an Ambisonics binaural decoder. The Ambisonics signal could be derived from a microphone array recording or any other possible source.

It should be understood that HRTFs can be used, not only for headphone applications, but also for reproducing binaural sound via ordinary loudspeakers, e.g. with the support of cross-talk cancellation.

The M input signals may also come directly from a microphone array, this application is called a Virtual Artificial Head in the literature [2].

In both cases, the design of the digital filter for binaural signal generation as in FIG. 7 requires an HRTF database, comprising a set of HRTF representations, for the filter design and the performance of the filter can be improved significantly by suitable pre-processing of the HRTFs. The present invention proposes one such pre-processing method.

The application of producing a binaural signal from an Ambisonics signal is discussed in for example reference [6] which can be considered to present a state-of-the-art filter design method for this purpose. A set of HRIRs/HRTFs is required for the design. It is suggested in reference [6] that HRIRs can be pre-processed by minimizing time differences between the ears (ITD) at high frequencies (>~1.5 kHz), and that this reduces the HRIR complexity by reducing the energy of high orders in the spherical harmonic spectrum of an HRIR set. It is shown that an HRIR set modified in such a way can lead to an improved quality of the binaural signal produced with the presented filter design method.

It is acknowledged in reference [6] that while removing ITD from the HRTFs has limited perceptual consequences when listening to a single sound source, it is also important to consider the interaural coherence between the left and right ear signals in a diffuse sound field. An additional optimization criterion is therefore added to the filter design which restricts the binaural decoder to give the correct diffuse field coherence, even though the pre-processed HRTF data does not model a correct diffuse field inter-aural coherence. This forced restriction in reference [6] makes the filter design much more complex.

On the contrary, the proposed technology discloses how HRTFs/HRIRs or equivalent frequency response functions are pre-processed to both minimize ITD above a threshold frequency and at the same time achieve correct modelling of diffuse field coherence in a highly robust and efficient manner.

For a better understanding of the invention, it may be useful to provide a brief overview of general filter design theory.

A generalized filter design procedure for a filter configured to produce a binaural signal from M microphone signals is described in the following, to illustrate the utility of the proposed HRTF pre-processing in this application.

A filter design problem formulation can be exemplified by first assuming the existence of N sound sources, which are typically evenly distributed on a spherical surface around a microphone with M output signals. The response of each microphone signal in response to each of the N sound sources can be modelled by a complex frequency response matrix (also called a matrix of steering vectors) B(ω) of dimensions [M×N], where ω denotes frequency.

The effect of the filter can similarly be described by its complex frequency response matrix F(ω) of dimensions [2×M]. The effect of each of the N sound sources on the binaural output signal produced by the filter, in the filter design problem formulation, is thus modelled as the product of matrices F(ω) and B(ω): F(ω)B(ω).

The goal in the filter design problem formulation is to design a filter where the effect of each of the N sound sources on the binaural output signal is equal to a known HRTF response for that direction. An optimization criterion for the filter may therefore be formulated as:

$$\min_{F(\omega)}: \epsilon = norm(F(\omega)B(\omega) - HRTF(\omega)) \tag{1}$$

where HRTF(ω) is a [2×N] matrix of desired HRTF responses for the left and right ears for the N source positions and norm() denotes some error norm, for example mean-square of error magnitude.

This optimization problem is usually extended with different constraints on the filter F(ω) but serves here to illustrate the effect of the choice of the HRTF responses on the residual error.

In the following, non-limiting examples will be given:

In a particular example, the proposed HRIR/HRTF modification is to transform the HRIRs/HRTFs to linear phase at high frequencies above a threshold frequency $f_{lim}$, thus eliminating high frequency ITD, while adding a direction dependent, and possibly frequency independent interaural phase difference (IPD) which has the effect of lowering interaural coherence at high frequencies in diffuse sound fields.

More generally, any appropriate interaural phase difference (IPD), which has the effect of reducing interaural coherence at high frequencies, i.e. above a threshold frequency, may be used.

The threshold frequency $f_{lim}$ can for example be around 1.5 kHz, being selected higher or lower as needed by the application.

A convenient choice of high frequency IPD is to set it equal to the IPD of the original HRTF data at a specific reference frequency $f_{ref}$ where the diffuse field interaural coherence has a desired value. For example, $f_{ref}$ can be selected to be around 1200 Hz where the interaural coherence is low, e.g. below a threshold value. By the requirements of the application, $f_{ref}$ may be chosen higher or lower. The choice of $f_{ref}$ involves a trade-off since a lower value makes filter design residual error lower in some applications, while a higher value may correspond to a lower and more desirable interaural coherence. $f_{ref}$ is typically chosen to be lower than $f_{lim}$.

Expressing the proposed algorithm in the continuous-time Fourier domain, the modified $HRTF_{mod}(\omega)$ (with frequency ω expressed in rad/s) for each individual direction and ear is given by:

$$HRTF_{mod}(\omega) = \begin{cases} HRTF(\omega) & \omega < \omega_{lim} \\ |HRTF(\omega)| e^{\wedge}(-i(\omega\tau_m - a(\omega)\,\theta_{ref})) & \omega \geq \omega_{lim} \end{cases} \tag{2}$$

where $\omega_{lim}$ is the threshold frequency in rad/s and $\tau_m$ can be selected to be close to the average broad-band delay in seconds of the HRTF data set in all directions.

Basically, the term corm corresponds to a time delay that is set to be the same for all directions/ears to reduce or eliminate ITD. The phase angle $\theta_{ref}$ is a constant that is direction dependent and thereby introduces IPD.

For example, the phase angle $\theta_{ref}$ can be selected as:

$$\theta ref = \angle HRTF(\omega_{ref}) - \omega_{ref}\tau_m \quad (3)$$

where $\omega_{ref}$ is the frequency in rad/s selected as reference for high frequency IPD, and the "angle" operator is an operator for complex numbers that returns a real value that represents the phase angle of a complex number (here the HRTF at $\omega_{ref}$). There are other ways of setting the phase angle $\theta_{ref}$ to provide the desired result of low high frequency coherence. For example, by giving phase angle $\theta_{ref}$ a small frequency dependency, or a small change in directional dependency, or by geometrically rotating the HRTF coordinate system before applying the phase adjustment.

The frequency dependent real number $a(\omega)$ may be set to a substantially constant value and can be used to control the amount of phase modification applied at different frequencies. In a basic implementation it may be chosen as $a(\omega)=1$.

The time delay parameter $\tau_m$ could also be made frequency dependent without affecting the desired properties of the processed HRTFs, as long as it is direction independent, or varies insignificantly with direction.

Phase discontinuities around the transition frequency could be mitigated, e.g. by applying the phase modification gradually over a transition band.

For example, the HRTF modification may be applied several times to a HRTF data set, using different values for the parameters of the algorithm.

It should also be understood that the HRTF modification may be applied to any band of frequencies and is not limited to being applied above a frequency limit $f_{lim}$. By way of example, it is thus possible reduce the Interaural Time Differences (ITD) in a frequency band or range above a first lower threshold frequency, while below another higher threshold frequency.

There are no restrictions on the HRTF set the algorithm is applied to and it should be understood that the invention may be applied to any frequency response function.

Figure 8:
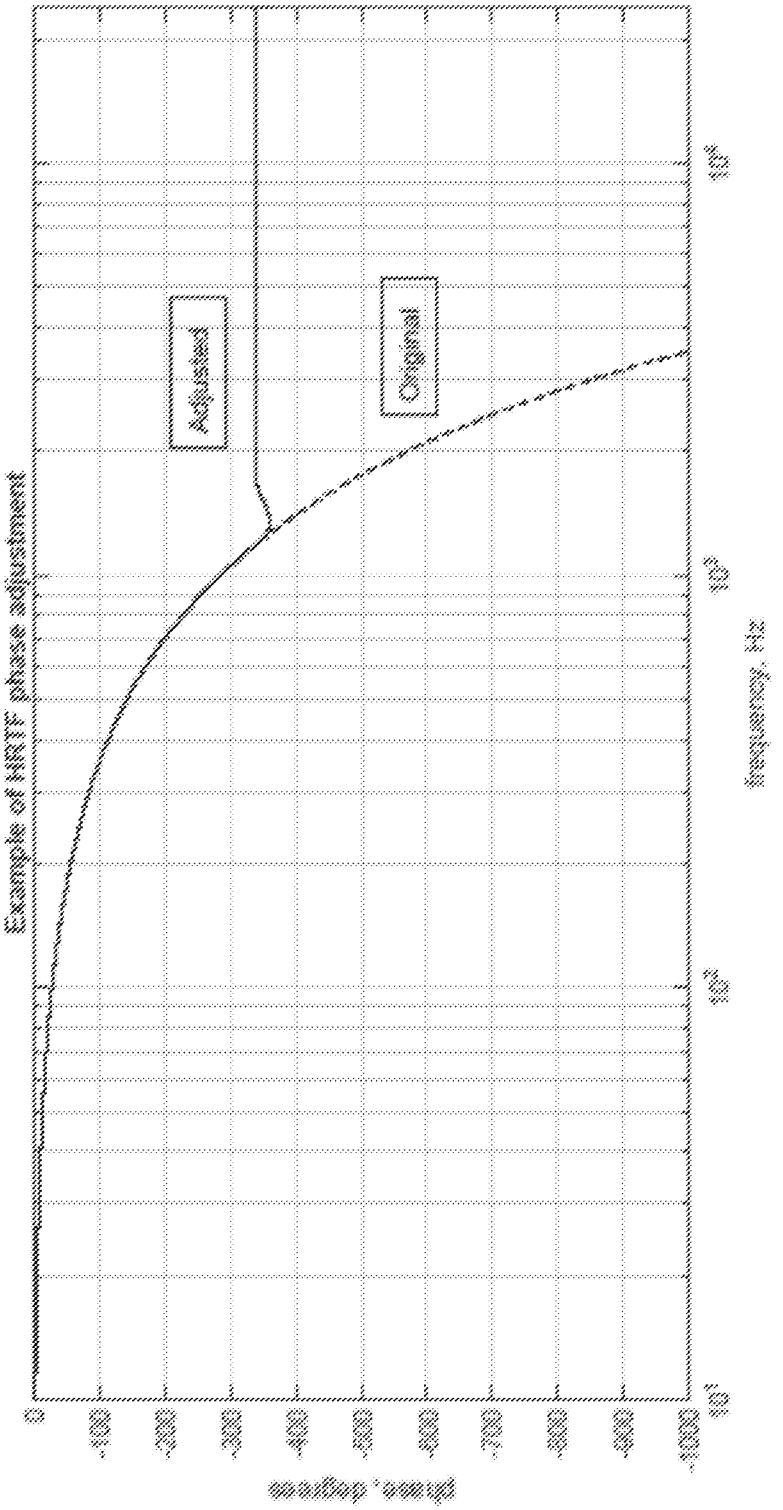
FIG. 8 is a schematic diagram illustrating a conceptual example of an HRTF phase adjustment for a specific ear and direction.

FIG. 8 shows a conceptual example of an HRTF phase adjustment for a specific ear and direction.

It includes two phase curves, original phase response and adjusted phase response. The average HRTF delay $\tau_m$ in this example is assumed to be zero, so that remaining delay is defined as acoustic propagation delay to the ear in relation to the delay to a point in the center of the head. The illustrated original HRTF phase is representative of a direction with a positive delay to the ear, giving a negative phase shift which is linearly growing with frequency. Choosing $f_{lim}$=1.5 kHz and $f_{ref}$=1.2 kHz, the modified phase curve is flat above $f_{lim}$=1.5 kHz, indicating zero delay, and has a phase offset corresponding to the original HRTF phase at $f_{ref}$=1.2 kHz.

By way of example, a practical result that may be attained by the method is to reduce the interaural time differences (ITD) at high frequencies that occurs between the left and right ear HRTFs for sound incidence from any given direction. This can be done without large perceptual impact, since the hearing system depends mostly on interaural level differences at high frequencies.

However, simply removing ITD at high frequencies has negative perceptual impact when the HRTFs are used with a diffuse sound field because zero ITD corresponds to a high interaural coherence, i.e. signal correlation between the ears. This is accounted for by further adjusting the interaural phase difference for the set of HRTFs so that interaural coherence becomes low at high frequencies, as is the case for the unmodified HRTFs.

The application of a VAH relies on a filter design which uses a HRTF database, and the VAH performance is increased considerably by this HRTF modification. This can e.g. allow the use of simpler microphone arrays with fewer capsules.

Another application is a filter design for estimating a binaural signal from a so-called Ambisonic signal, which also relies on a HRTF set or database and filter design is considerably simplified by such a HRTF modification. For the Ambisonics case, there are several non-patent references documenting a similar effect, but using a different implementation. A benefit of the implementation described here is its simplicity which also reduces the risk of introducing unwanted artifacts.

A HRTF set or database can also be used to generate a binaural signal for a virtual sound source for e.g. headphone listening. If head-tracking is used, the active HRTF filter may be switched in real-time so that the virtual sound source stays in the same spot when the listener turns the head. There may be an audible click as the filter is switched. Using the proposed HRTF modification, this click is significantly decreased since the time delay difference between different directions is reduced to a very low value at high frequencies.

It will be appreciated that the methods and arrangements described herein can be implemented, combined and re-arranged in a variety of ways.

By way of example, there is provided a system configured to perform the method as described herein.

For example, embodiments may be implemented in hardware, or in software for execution by suitable processing circuitry, or a combination thereof. The steps, functions, procedures, modules and/or blocks described herein may be implemented in hardware using any conventional technology, such as discrete circuit or integrated circuit technology, including both general-purpose electronic circuitry and application-specific circuitry.

For example, the described method may be translated into to a discrete-time implementation for digital signal processing.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

Figure 9:
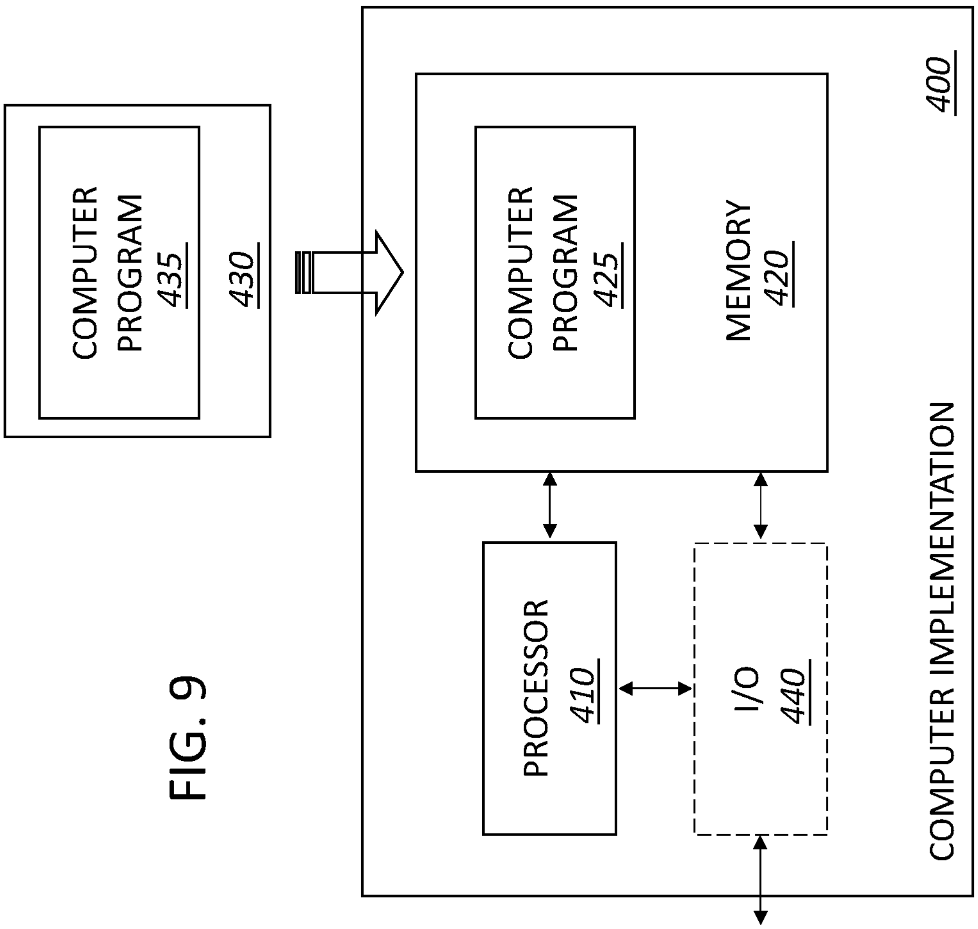
FIG. 9 is a schematic diagram illustrating an example of a computer-implementation according to an embodiment.

FIG. 9 is a schematic diagram illustrating an example of a computer-implementation according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by the processor 410, cause the processor 410 to perform the tasks described herein.

The proposed technology also provides a carrier comprising the computer program, wherein the carrier is one of an electronic signal, an optical signal, an electromagnetic signal, a magnetic signal, an electric signal, a radsignal, a microwave signal, or a computer-readable storage medium.

By way of example, the software or computer program 425; 435 may be realized as a computer program product, which is normally carried or stored on a non-transitory computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The procedural flows presented herein may be regarded as a computer flows, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Alternatively, it is possible to realize the function modules predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] H. Møller, "Fundamentals of binaural technology," *Applied Acoustics,* vol. 36, pp. 171-218, December 1992.

[2] E. Rasumow, "Synthetic reproduction of head-related transfer functions by using microphone arrays", Ph.D. thesis, School of Medicine and Health Sciences, University of Oldenburg, 2015.

[3] B. Bernshütz, "Microphone arrays and sound field decomposition for dynamic binaural recording", Ph.D. thesis, University of Technology Berlin, 2016.

[4] B. Bernschütz, "A Spherical Far Field HRIR/HRTF Compilation of the Neumann KU 100" in *Proceedings of the AIA-DAGA* 2013 *Conference on Acoustics,* Merano, Italy, 2013, pp. 592-595.

[5] J. Blauert, *Spatial Hearing: The Psychophysics of Human Sound Localization,* MIT Press, Cambridge, MA, USA, 2001.

[6] M. Zaunschirm, C. Schörkhuber, and R. Höldrich, "Binaural rendering of ambisonic signals by head-related impulse response alignment and a diffuseness contraint," *The Journal of the Acoustical Society of America,* vol. 143, no. 6, pp. 3616-3627, June 2018.

[7] P. Stoica and R. Moses, "Spectral Analysis of Signals", Prentice Hall, 2005

The invention claimed is:

1. An audio filter design procedure comprising a method for processing a set including Head-Related Transfer Functions, HRTFs, for at least two different directions of sound incidence to enable improved generation, modeling or simulation of ear signals corresponding to a diffuse sound field, wherein, for each direction of sound incidence to the head, a left-ear HRTF represents the transfer function from a sound source to the left ear, and a right-ear HRTF represents the corresponding transfer function to the right ear, wherein said method comprises:

applying a phase adjustment to each HRTF, for each ear and direction, for reducing Interaural Time Differences, ITD, above a threshold frequency or in a frequency band above the threshold frequency; and adding a direction-dependent Interaural Phase Difference, IPD, to each HRTF, for each ear and direction, for reducing Interaural Coherence when modelling or simulating a diffuse sound field, wherein the audio filter design procedure further comprises a step of generating an audio filter based on the processed set of HRTFs.

2. The method of claim 1, wherein said set of HRTFs, before applying said phase adjustment, are referred to as unprocessed HRTFs, and said step of adding a direction-dependent IPD is performed such that when modeling or simulating a diffuse sound field, the Interaural Coherence becomes perceptually the same as that of said unprocessed HRTFs, wherein the direction-dependent IPD is set to be equal to an IPD of the unprocessed HRTFs at a reference frequency where diffuse field Interaural Coherence is below a threshold value.

3. The method of claim 1, wherein the direction-dependent IPD is constant as a function of frequency above the threshold frequency.

4. The method of claim 1, wherein the step of applying a phase adjustment and the step of adding a direction-dependent IPD provides a modified $HRTF_{mod}(\omega)$ for each direction and ear given by:

$$HRTF_{mod}(\omega)=HRTF(\omega)\ \omega<\omega_{lim}\ |HRTF(\omega)|e\hat{}(-i(\omega\tau_m-a(\omega)\theta_{ref}))$$

where $\omega_{lim}$ is the threshold frequency in rad/s, and $\tau_m$ is a time delay parameter, and $\theta_{ref}$ is a phase angle, and a(ω) is a frequency dependent real number for controlling an amount of phase modification applied at different frequencies.

5. The method of claim 1, wherein said step of applying a phase adjustment to each HRTF is performed such that the ITD is gradually reduced with increasing frequency, above the threshold frequency, and wherein said step of adding the direction-dependent Interaural Phase Difference is also applied gradually with increasing frequency, above the threshold frequency.

6. The audfilter design procedure of claim 1, wherein the audfilter design procedure is adapted to provide the audfilter for generating a binaural signal for a virtual sound source, or for estimating a binaural signal from an Ambisonics signal, or for providing an audfilter design for a microphone array such as a Virtual Artificial Head.

7. The audfilter generated according to the audio filter design procedure of claim 1.

8. An audsystem comprising an audfilter according to claim 7.

9. A non-transitory computer-readable storage medium having stored thereon a computer program comprising instructions, which when executed by a computer, cause said computer to perform the method of claim 1.

10. An audio filter design system comprising a system for processing a set including Head-Related Transfer Functions, HRTFs, for at least two different directions of sound incidence to improve generating, modeling or simulating ear signals corresponding to a diffuse sound field, wherein, for each direction of sound incidence to the head, a left-ear HRTF represents the transfer function from a sound source to the left ear, and a right-ear HRTF represents the corresponding transfer function to the right ear, wherein said system for processing is configured to apply a phase adjustment to each HRTF, for each ear and direction, for reducing Interaural Time Differences, ITD, above a threshold frequency or in a frequency band above the threshold frequency; and wherein said system for processing is configured to add a direction-dependent Interaural Phase Difference, IPD, to each HRTF, for each ear and direction, for reducing Interaural Coherence when modelling or simulating a diffuse sound field, wherein said audio filter design system is configured to generate an audio filter based on the processed set of HRTFs.

11. The audio filter design system of claim 10, wherein said set of HRTFs, before applying said phase adjustment, are referred to as unprocessed HRTFs, and said system for processing is configured to add the direction-dependent IPD such that when modeling or simulating a diffuse sound field, the Interaural Coherence becomes perceptually the same as that of said unprocessed HRTFs, wherein said system for processing is configured to set the direction-dependent IPD to be equal to an IPD of the unprocessed HRTFs at a reference frequency where diffuse field Interaural Coherence is below a threshold value.

12. The audio filter design system of claim 10, wherein said system for processing is configured to set the direction-dependent IPD to be constant as a function of frequency above the threshold frequency.

13. The audio filter design system of claim 10, wherein said system for processing is configured to provide a modified $HRTF_{mod}(\omega)$ for each direction and ear given by:

$$HRTF_{mod}(\omega)=HRTF(\omega)\ \omega<\omega_{lim}\ |HRTF(\omega)|e\hat{}(-i(\omega\tau_m-a(\theta_{ref}))\ \omega\geq\omega_{lim}$$

where $\omega_{lim}$ is the threshold frequency in rad/s, and $\tau_m$ is a time delay parameter, and $\theta_{ref}$ is a phase angle, and a(ω) is a frequency dependent real number for controlling an amount of phase modification applied at different frequencies.

14. The audio filter design system of claim 11, wherein said system for processing is configured to model or simulate the diffuse sound field based on processed HRTFs in combination with an additional set of HRTFs, in total constituting an overall set of HRTFs for multiple directions.

15. The audio filter design system of claim 11, wherein said system for processing is configured to process at least a subset of the HRTFs of an HRTF database.

* * * * *